Patented May 15, 1951

2,552,769

UNITED STATES PATENT OFFICE 2,552,769

OCTYLTHIOPHENE PREPARATION

Philip D. Caesar, Wenonah, N. J., assignor to Socony-Vacuum Oil Company, Incorporated, a corporation of New York No Drawing. Application August 25, 1947, Serial No. 770,549

8 Claims. (Cl. 260—329)

This invention relates to the alkylation of thiophenes and, more particularly, is directed to a catalytic method for alkylating thiophene in the presence of a Friedel-Crafts metal halide catalyst.

Alkylation reactions are well known in the art and connote the union between alkyl radicals and molecules of organic compounds under conditions of temperature, pressure and time ordinarily referred to in the art as alkylating conditions. The compounds thus produced represent structurally the substitution of an alkyl radical for a hydrogen atom in the organic compound molecule. Generally, the temperature and, to a certain extent, the pressure and time of reaction employed in alkylation operations depend upon whether the alkylation is effected in the absence or presence of alkylation catalysts. The two methods are generally referred to as thermal and catalytic alkylation respectively and it is a catalytic alkylation process with which the present invention is concerned.

The alkylation of thiophenes has heretofore been accomplished through the Wurtz reaction by condensing iodo-derivaties of thiophene with iodo- or bromo-alkyls in the presence of metallic sodium. However, the yields of alkylthiophene compounds so obtained have not been at all encouraging and the cost of reagents involved has been prohibitive in so far as commercial utilization of this method is concerned. The Friedel-Crafts synthesis has also been proposed for preparing alkylthiophenes, for example, by contacting an alkyl halide with a mixture of thiophene and aluminum chloride. This reaction, although applicable with considerable success in effecting alkylation of aromatic hydrocarbons, is only moderately successful where thiophene is involved. This appears to be due to the relative instability of the thiophene ring, the aluminum chloride attacking the sulfur of the thiophene ring and causing undesirable secondary reactions with resultant low yields of alkylthiophenes.

The alkylation of thiophene has been an exceedingly difficult reaction to carry out with good yields of desired product. The usual metal halide Friedel-Crafts alkylation catalysts, such as aluminum chloride, ferric chloride, stannic chloride, and the like, when brought into contact with thiophene cause excessive resinification or polymerization of the thiophene reactant. The resinification or polymerization usually occurs before alkylation can be effected and if the expected reaction product is formed, it is only in very small amounts. This fact has been recently pointed out in an article by W. M. Kutz and B. B. Corson in the Journal of American Chemical Society 68, 1477 (1946), in which it was observed that the chlorides of aluminum, iron, or tin were unsatisfactory as catalysts for promoting the alkylation of thiophene.

It has now been discovered that the alkylation of thiophene can be carried out in an efficient manner using a metal halide Friedel-Crafts catalyst by preventing direct contact between said catalyst and the thiophene reactant, such as was present in the aforementioned unsatisfactory attempts to alkylate thiophene. It has been found, for example, that thiophenes can be alkylated with alkylating agents in the presence of a metal halide Friedel-Crafts catalyst to give good yields of the desired alkylthiophene, providing the catalyst is added to a mixture of thiophene and alkylating agent and that the undesirable resinification or polymerization of the thiophene reactant heretofore encountered is thereby substantially eliminated.

Accordingly, it is an object of the present invention to provide an efficient process for synthesizing alkylthiophenes. Another object is to provide a process for alkylating an alkylatable thiophene in the presence of a metal halide Friedel-Crafts catalyst. A more specific object is to afford a process for catalytically alkylating thiophene. A still further object is the provision of a relatively inexpensive process for accomplishing the alkylation of thiophenes. These and other objects which will be apparent to those skilled in the art are attained in accordance with the present invention.

The catalysts employed in the present process are the metal halide Friedel-Crafts catalysts; that is, aluminum chloride, aluminum bromide, stannic chloride, zinc chloride, ferric chloride, and the like. The catalyst may also be embodied in the form of an organic complex; for example, an aromatic hydrocarbon-metal halide catalyst of the above type, such as benzene-aluminum chloride, or an olefin-metal halide, such as isobutylene-aluminum chloride complex, is contemplated for use in catalytically promoting the alkylation of thiophenes in accordance with this invention. Among the various metal halides of the Friedel-Crafts type which may be employed in the process described herein, preference is accorded aluminum halides and, in particular, aluminum chloride. The amount of catalyst used in the present alkylation process will usually be between about 1 and about 10 per cent, based on the weight of the charge.

It is generally thought that the chemical behavior of thiophene is very similar to that of benzene. However, there are some very striking differences, as will be pointed out hereinafter. It has been found, for example, that the conditions which favor alkylation of thiophene in accordance with this invention are not at all satisfactory for alkylation of benzene and, conversely, the method heretofore suitably employed in reacting benzene and an alkylating agent in the presence of a metal halide Friedel-Crafts catalyst has, as indicated above, not been feasible in a process in which thiophene is involved.

Thiophene or alkylatable derivatives of thiophene having one or more substituent groups, such as halogen, alkyl, or aryl groups attached to the thiophene ring, may be alkylated in accordance with this invention. The 2- and 5-positions in the thiophene ring, being adjacent to the sulfur atom, are generally much more reactive than the 3- and 4-positions, and in the alkylation reaction, the entering alkyl group will preferably attach itself to the carbon atom adjacent to the sulfur. When the 2-position of the thiophene ring is already occupied by a subtituent group, the entering group will preferably attach itself to the 5-position. Generally, a mixture of monoalkylthiophene and dialkylthiophene will be obtained upon contacting thiophene with an alkylating agent under conditions described herein.

The alkylating agents to be used in the present process may be olefinic hydrocarbons, such as propylene, isobutylene, isoamylene, diisobutylene, and higher straight chain and branched chain olefins having from 2 up to 30 carbon atoms. Alkyl halides, such as amyl chlorides and butyl chlorides; alcohols, such as amyl alcohol; and mercaptans, such as butyl mercaptan, may likewise be used as alkylating agents in the process of this invention. However, as a general rule, olefinic hydrocarbons, particularly the more active olefins having one or more branched chains, are preferred for use as alkylating agents. A convenient and preferred source of olefinic hydrocarbons is the fixed gases obtained as by-products of commercial cracking operations in petroleum refineries. These fixed gases may furnish the bulk of the lighter olefinic hydrocarbons, or it may be necessary or desirable to obtain additional supplies. Additional quantities of the lighter olefinic hydrocarbons or other and heavier olefinic hydrocarbons may be easily synthesized, if necessary, from the paraffinic hydrocarbons present in the fixed gases referred to hereinabove or from other materials, as is well known to those familiar with the art.

The alkylation of a thiophene with an alkylating agent can be carried out employing equimolar quantities of thiophene and alkylating agent. However, the presence of an excess of thiophene has in some instances been found to be desirable, giving an increased yield of the desired product. The reaction rate is dependent on the temperature, increasing with increasing temperatures, the upper limit of temperature being that at which dealkylation is favored. Generally, a temperature between about 0° C. and about 200° C. and a pressure between atmospheric and about 150 pounds per square inch are satisfactory for effecting the desired alkylation reaction. The effect of increased pressure, theoretically, is toward increased reaction but from a practical standpoint, this is not a very great effect with reactions such as those involved herein, which go readily at normal pressures. Ordinarily, a pressure sufficient to maintain the reactants in the liquid phase is employed and this will be more or less dependent upon the particular temperature involved and on the nature of the reactants used. When the more reactive alkylating agents, such as the isoolefinic hydrocarbons are used, lower temperatures may be employed and with the less reactive alkylating agents, for example, normal olefinic hydrocarbons, higher temperatures may be employed. The reaction time depends primarily upon the temperature and the reactivity of the alkylating agent, and may vary between a few minutes and several hours. It will, of course, be understood that the above reaction variables are more or less interdependent.

It is an essential feature of this invention, in bringing the reactants and catalyst into contact, that the metal halide Friedel-Crafts catalyst employed be not brought into direct initial contact with the thiophene reactant involved. It has been found, under such conditions, that the contact of catalyst with thiophene promotes polymerization of the latter reactant and the thiophene polymer so obtained forms a coating about the particles of catalyst, thereby rendering them ineffective for use in the desired alkylation reaction. Under conditions to be employed in the process of the present invention, direct contact between catalyst and thiophene reactant is avoided by adding the catalyst in the form of an organo-complex to the thiophene and thereafter heating to gradually release the catalyst and simultaneously adding the alkylating agent to the reaction mixture. A particularly preferable modification is to mix the thiophene reactant and alkylating agent and thereafter add the catalyst to the mixture maintained under alkylating conditions. Thus, for example, in alkylating thiophene with a normally gaseous isoolefin in the presence of an aluminum chloride catalyst, it has been found that the reaction is suitably carried out by adding the catalyst to a mixture of isoolefin and thiophene maintained at about room temperature and under sufficient pressure to assure the presence of liquid isoolefin. An alternate procedure involves the independent preparation of an aromatic hydrocarbon-aluminum chloride or an isoolefin-aluminum chloride complex which is added to thiophene and heated to about 60° C., while the isoolefin reactant is added to the mixture with agitation.

The process of this invention may be further understood from a consideration of the following illustrative and comparative examples.

*Example I*

Ten grams of aluminum chloride were added in small portions to a mixture of 84 grams of thiophene and 70 grams of isoamylene. The mixture was maintained at a temperature of 30° C. for a period of 2 hours. At the end of this time, a liquid sludge which had formed was separated from the upper hydrocarbon layer. After water-washing and neutralizing the hydrocarbon layer so obtained, it was distilled to yield 16 grams of amylthiophene having a specific gravity of 0.933 at 60° F.

*Example II*

One gram of aluminum chloride was added to a mixture of 42 grams of thiophene and 55 grams of diisobutylene maintained at a temperature of 25° C. A liquid sludge formed and heat was given off upon contact of the reactants. The temperature was allowed to rise slowly and a maximum temperature of 70° C. was reached in about one-half hour. When the temperature dropped to 60° C., the reaction vessel was cooled and the resulting liquid product was separated from 1.3 grams of aluminum chloride sludge which had formed. The liquid product so obtained was water-washed and distilled. The following cuts were taken:

| | Grams |
|---|---|
| Recovered thiophene, <100° C | 25 |
| Octylthiophene, 250–280° C | 25 |
| Dioctylthiophene, 315–325° C | 40 |

This amounts to a 66 per cent (by weight of total charge) conversion per pass to alkylthiophenes and a 90–95 per cent theoretical yield.

*Example III*

Ten grams of stannic chloride were added slowly with agitation to a mixture of 52 grams of thiophene and 56 grams of diisobutylene. During the addition, the temperature rose from about 30° C. to about 75° C. The reaction was continued for a period of 4 hours at a temperature of 70–80° C. The resulting reaction product was then water-washed and dried. The 90 grams of liquid product were distilled and the following cuts were taken:

| | Grams |
|---|---|
| Recovered thiophene, <100° C | 22 |
| Octylthiophene, 230–280° C | 42 |
| Dioctylthiophene, 280–320° C | 25 |

*Example IV*

Twenty grams of diisobutylene were slowly added to a mixture of 50 grams of thiophene and 1 gram of aluminum chloride maintained at a temperature of 25° C. An almost solid black sludge formed but no heat was evolved. The mixture was heated to a temperature of 35–40° C. for 2.5 hours. The resulting liquid product was separated from 10–11 grams of aluminum chloride sludge which had formed. The product was then water-washed and distilled and the following cuts were taken:

| | Grams |
|---|---|
| Recovered thiophene, <110° C | 33 |
| Octylthiophene, 250–300° C | 17 |
| Dioctylthiophene, >300° C | 10 |

This amounts to a 40 per cent (by weight of total charge) conversion per pass to alkylthiophenes and a 75 per cent theoretical yield.

*Example V*

One and one-half grams of aluminum chloride were added to a mixture of 40 grams of benzene and 56 grams of diisobutylene maintained at a temperature of 25° C. Upon contact of the reactants, the temperature rose to about 50° C. where is was kept for one-half hour. The resulting liquid product was separated from the 1–2 grams of aluminum chloride sludge which had formed. The liquid product so obtained was then water-washed and distilled and the following cuts were taken:

| | Grams |
|---|---|
| Recovered Benzene (some diisobutylene), <100° C | 34 |
| Mostly polymer, 100–200° C | 19 |
| Some dibutylbenzenes, 200–250° C | 21 |
| Residue, >250° C | 17 |

*Example VI*

Twenty grams of isobutylene were added over a period of one-half hour to a mixture of 84 grams of thiophene and 1.5 grams of aluminum chloride maintained at a temperature of 35° C. The temperature rose a little at first but soon decreased and there were less than 4 grams of material boiling over 85° C., indicating that no alkylthiophenes resulted from the reaction.

*Example VII*

Fifty grams of isobutylene were added over a period of one hour to a mixture of 84 grams of thiophene and 3 grams of aluminum chloride agitated in a reaction vessel maintained at a temperature of 65–75° C. The liquid product was separated from 15 grams of aluminum chloride sludge which had formed and was then water-washed and distilled to give the following cuts:

| | Grams |
|---|---|
| Unreacted isobutylene | 25 |
| Unreacted thiophene, <110° C | 40 |
| Butylthiophene, 140–180° C | 14 |
| Residue, >180° C. | |

*Example VIII*

Forty-five grams of isobutylene were added over a period of one hour to 78 grams of benzene and 3 grams of aluminum chloride agitated in a reaction vessel at a temperature of 25–30° C. The liquid product resulting was separated from 6 grams of aluminum chloride sludge which formed and was then water-washed and distilled to give the following cuts:

| | Grams |
|---|---|
| Unreacted isobutylene | None |
| Unreacted benzene, <110° C | 50 |
| Butylbenzene, 140–190° C | 20 |
| Dibutylbenzene, 190–230° C | 15 |
| Residue, >230° C | 30 |

*Example IX*

Two grams of aluminum chloride were added to a mixture of 84 grams of thiophene and 90 grams of tertiary butyl chloride agitated in a reaction vessel at a temperature of 40–45° C. The reaction was allowed to proceed for 2 hours at this temperature, during which time hydrogen chloride was evolved. The resulting liquid product was separated from aluminum chloride sludge which had formed and was then water-washed and distilled to give the following cuts:

| | Grams |
|---|---|
| Unreacted thiophene and tertiary butyl chloride, <160° C | 109 |
| Butylthiophene, 190–215° C | 9 |
| Residue, >215° C | 17 |

As had been previously found, no alkylation of thiophene occurs when isobutylene is bubbled into a mixture of thiophene and aluminum chloride. The runs described in Examples VI and VII verify this observation. It will be noted, however, that under these conditions benzene was readily alkylated (Example VIII). Excellent yields of octylthiophenes were obtained when the catalyst was added to a mixture of thiophene and diisobutylene (Examples II and III). On the other hand, much poorer yields of octylthiophenes were obtained when diisobutylene was added to a mixture of aluminum chloride and thiophene (Example IV). Several conclusions can be drawn from the above results. In the first place, under the conditions most favorable for the alkylation of thiophene with diisobutylene, benzene and diisobutylene reacted to a very small degree. The chief products obtained upon contact of benzene and isobutylene were polymers of the diisobutylene (Example V). Secondly, the products of the alkylation of thiophene with diisobutylene were octyl and dioctylthiophene, while the alkylation of benzene with diisobutylene which does occur at higher temperatures yields tertiary butylbenzenes.

Without being unduly limited by any theory, it would appear that the fact that the active diisobutylene will alkylate thiophene, but the equally active isobutylene will not, may be accounted for by the formation of a hard resinous coating of thiophene polymer which forms about the particles of aluminum chloride catalyst. The aluminum chloride left in the core of these particles is still active, as has actually been found. The gaseous isobutylene bubbling into and out of the thiophene containing this resin-coated catalyst does not make sufficient contact with it to permeate through to the active catalyst. Apparently, the liquid diisobutylene does make sufficient contact with the catalyst even though it is added after the resinous coating is formed. However, the yield of alkylate so obtained is decidedly lower than when the diisobutylene is present before the catalyst coating has had an opportunity to form.

I claim:

1. A method of preparing octylthiophenes, which comprises mixing thiophene with diisobutylene and contacting the resulting mixture under alkylation conditions with a metal halide Friedel-Crafts catalyst.

2. A method of preparing octylthiophenes, which comprises mixing thiophene with diisobutylene and contacting the resulting mixture under alkylation conditions with an aluminum chloride catalyst.

3. A method of preparing octylthiophenes, which comprises mixing thiophene with diisobutylene and contacting the resulting mixture under alkylation conditions with a stannic chloride catalyst.

4. A method for preparing an octylthiophene, which comprises mixing a thiophene having at least one replaceable nuclear hydrogen with diisobutylene and contacting the resulting mixture under alkylation conditions with a metal halide Friedel-Crafts catalyst.

5. A method for preparing an octylthiophene, which comprises mixing a thiophene having at least one replaceable nuclear hydrogen with diisobutylene and contacting the resulting mixture under alkylation conditions with between about 1 and about 10 per cent by weight of a metal halide Friedel-Crafts catalyst.

6. A method for preparing an octylthiophene, which comprises mixing a thiophene having at least one replaceable nuclear hydrogen with diisobutylene and contacting the resulting mixture at a temperature between about 0° C. and about 200° C. and a pressure between atmospheric and about 150 pounds per square inch with a metal halide Friedel-Crafts catalyst.

7. A method for preparing an octylthiophene, which comprises mixing a thiophene having at least one replaceable nuclear hydrogen with diisobutylene and contacting the resulting mixture at a temperature between about 0° C. and about 200° C. and a pressure between atmospheric and about 150 pounds per square inch with an aluminum chloride catalyst.

8. A method for preparing an octylthiophene, which comprises mixing a thiophene having at least one replaceable nuclear hydrogen with diisobutylene and contacting the resulting mixture at a temperature between about 0° C. and about 200° C. and a pressure between atmospheric and about 150 pounds per square inch with a stannic chloride catalyst.

PHILIP D. CAESAR.

REFERENCES CITED

The following references are of record in the file of this patent:

UNITED STATES PATENTS

| Number | Name | Date |
| --- | --- | --- |
| 2,141,611 | Malishev | Dec. 27, 1938 |
| 2,396,144 | Anderson | Mar. 5, 1946 |

OTHER REFERENCES

Thomas, Anhydrous Aluminum Chloride in Organic Chemistry, pp. 198, 199, 870, 871; Reinhold Pub. Co., N. Y., 1941.

Morton, "The Chemistry of Heterocycles," page 44; McGraw Hill, N. Y., 1946.